(12) United States Patent
Katz et al.

(10) Patent No.: US 10,896,494 B1
(45) Date of Patent: Jan. 19, 2021

(54) DIRTY LENS IMAGE CORRECTION

(71) Applicants: Sagi Katz, Yokneam Ilit (IL); David Ben Ezra, Los Angeles, CA (US)

(72) Inventors: Sagi Katz, Yokneam Ilit (IL); David Ben Ezra, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/567,005

(22) Filed: Sep. 11, 2019

Related U.S. Application Data

(60) Provisional application No. 62/737,442, filed on Sep. 27, 2018.

(51) Int. Cl.
| | |
|---|---|
| *G06T 5/50* | (2006.01) |
| *H04N 13/239* | (2018.01) |
| *G06T 7/00* | (2017.01) |
| *G06T 7/90* | (2017.01) |
| *H04N 13/128* | (2018.01) |
| *G06T 7/593* | (2017.01) |
| *H04N 13/332* | (2018.01) |
| *G06T 5/10* | (2006.01) |
| *H04N 13/00* | (2018.01) |

(52) U.S. Cl.
CPC ............... *G06T 5/50* (2013.01); *G06T 5/10* (2013.01); *G06T 7/0002* (2013.01); *G06T 7/593* (2017.01); *G06T 7/90* (2017.01); *G06T 7/97* (2017.01); *H04N 13/128* (2018.05); *H04N 13/239* (2018.05); *H04N 13/332* (2018.05); *G06T 2207/30168* (2013.01); *H04N 2013/0077* (2013.01); *H04N 2013/0081* (2013.01)

(58) Field of Classification Search
CPC ........... G06T 5/50; G06T 7/90; G06T 7/0002; G06T 5/10; G06T 7/97; G06T 7/593; G06T 2207/30168; H04N 13/332; H04N 13/128; H04N 13/239; H04N 2013/0081; H04N 2013/0077
USPC .......................................................... 348/42
See application file for complete search history.

(56) References Cited

U.S. PATENT DOCUMENTS

2013/0039426 A1* 2/2013 Helle ..................... H04N 19/52
375/240.16
2017/0372527 A1* 12/2017 Murali .................. G01S 17/894
(Continued)

*Primary Examiner* — Tung T Vo
(74) *Attorney, Agent, or Firm* — Culhane Meadows PLLC; Stephen J. Weed

(57) ABSTRACT

Systems and method for correcting images including artifacts due to dirty camera lenses of electronic device are disclosed. Correction of images by the systems and methods includes obtaining a first raw pixel image of a scene captured with a first camera, obtaining a second raw image of the scene captured with a second camera separate from the first camera in a camera baseline direction, rectifying the first and second raw pixel images to create respective first and second rectified pixel images, determining disparity correspondence between corresponding image pixel pairs of the first and second rectified images in the camera baseline direction, mapping first and second rectified images into the same domain using the determined disparity, detect image artifact regions within each domain mapped image by comparing corresponding regions of the domain mapped images, determining correction factors for each detected image artifact region, and correcting the rectified first and second images by applying the determined correction factors.

20 Claims, 15 Drawing Sheets

(56) References Cited

U.S. PATENT DOCUMENTS

| | | | |
|---|---|---|---|
| 2018/0220149 A1* | 8/2018 | Son | H04N 19/159 |
| 2018/0234697 A1* | 8/2018 | Jang | H04N 19/66 |
| 2019/0028731 A1* | 1/2019 | Chuang | H04N 19/159 |
| 2019/0058896 A1* | 2/2019 | Huang | H04N 19/517 |
| 2019/0082191 A1* | 3/2019 | Chuang | H04N 19/513 |
| 2019/0335170 A1* | 10/2019 | Lee | H04N 19/52 |
| 2019/0342547 A1* | 11/2019 | Lee | H04N 19/52 |
| 2019/0385276 A1* | 12/2019 | Kondo | G06T 7/215 |

* cited by examiner

DIRTY LENS IMAGE CORRECTION

CROSS-REFERENCE TO RELATED APPLICATIONS

This application claims priority to U.S. Provisional Application Ser. No. 62/737,442 entitled Dirty Lens Image Correction, filed on Sep. 27, 2018, the contents of which are incorporated fully herein by reference.

TECHNICAL FIELD

The present subject matter relates to electronic devices, e.g., eyewear devices, and mobile devices and techniques to correct images obtained using cameras with dirty lenses.

BACKGROUND

Electronic devices, such as wearable devices, including portable eyewear devices (e.g., smartglasses, headwear, and headgear); mobile devices (e.g., tablets, smartphones, and laptops); and personal computers available today integrate image displays and cameras.

Wearable device may include multiple cameras for gathering image information from objects in a scene. If the lenses of one or more cameras are dirty (e.g., due to finger prints, dirt, grime, etc.), the image information from the scene may include undesirable artifacts. These artifacts interfere with the ability to accurately reproduce the scene on a display. Methods and systems for reducing the impact of artifacts due to dirty lenses are desirable.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating cameras such as shown in any of the drawings, are given by way of example only, for illustration and discussion purposes. In operation for image correction, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any camera or component of the camera.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1A:
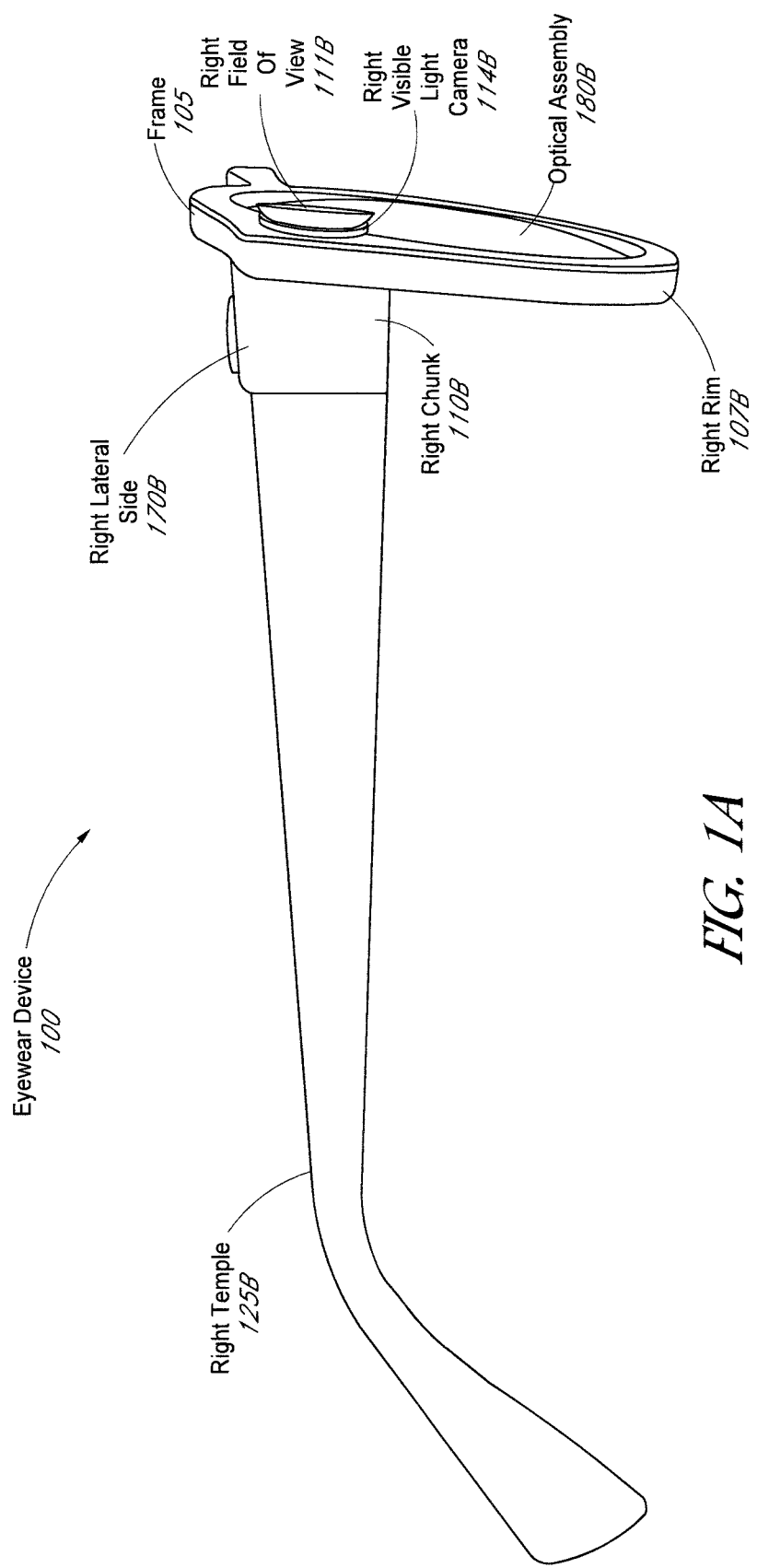
FIG. 1A is a right side view of an example hardware configuration of an eyewear device utilized in a dirty lens image correction system.

FIG. 1A is a right side view of an example hardware configuration of an eyewear device 100 for use in a dirty lens image correction system, which shows a right visible light camera 114B for gathering image information. As further described below, in the dirty lens image correction system, two cameras capture image information for a scene from two separate viewpoints. Artifacts introduced by one camera are then identified and corrected using image information from the other camera.

Figure 1B:
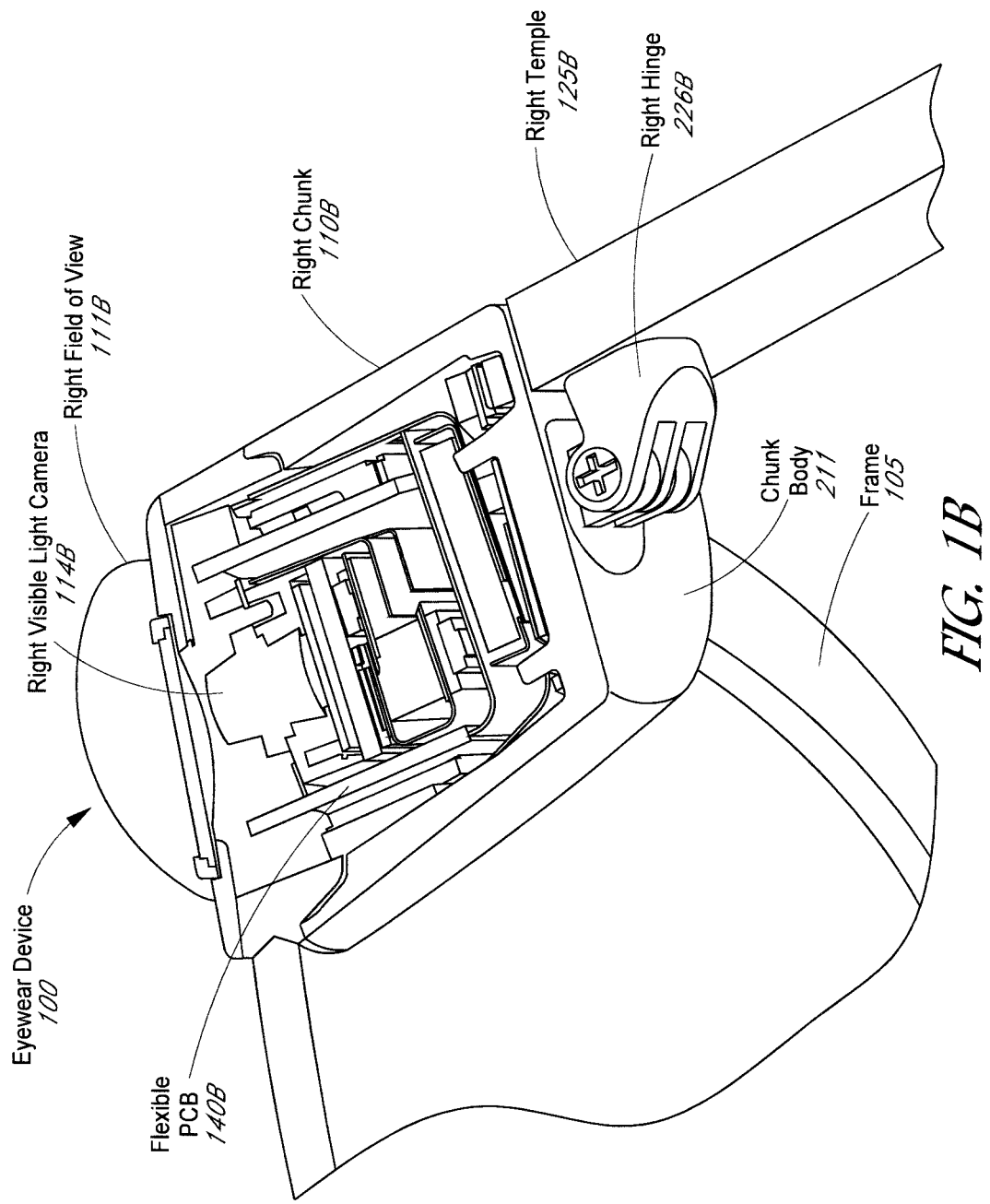
FIG. 1B is a top cross-sectional view of a right chunk of the eyewear device of FIG. 1A depicting a right visible light camera, and a circuit board.
Figure 1C:
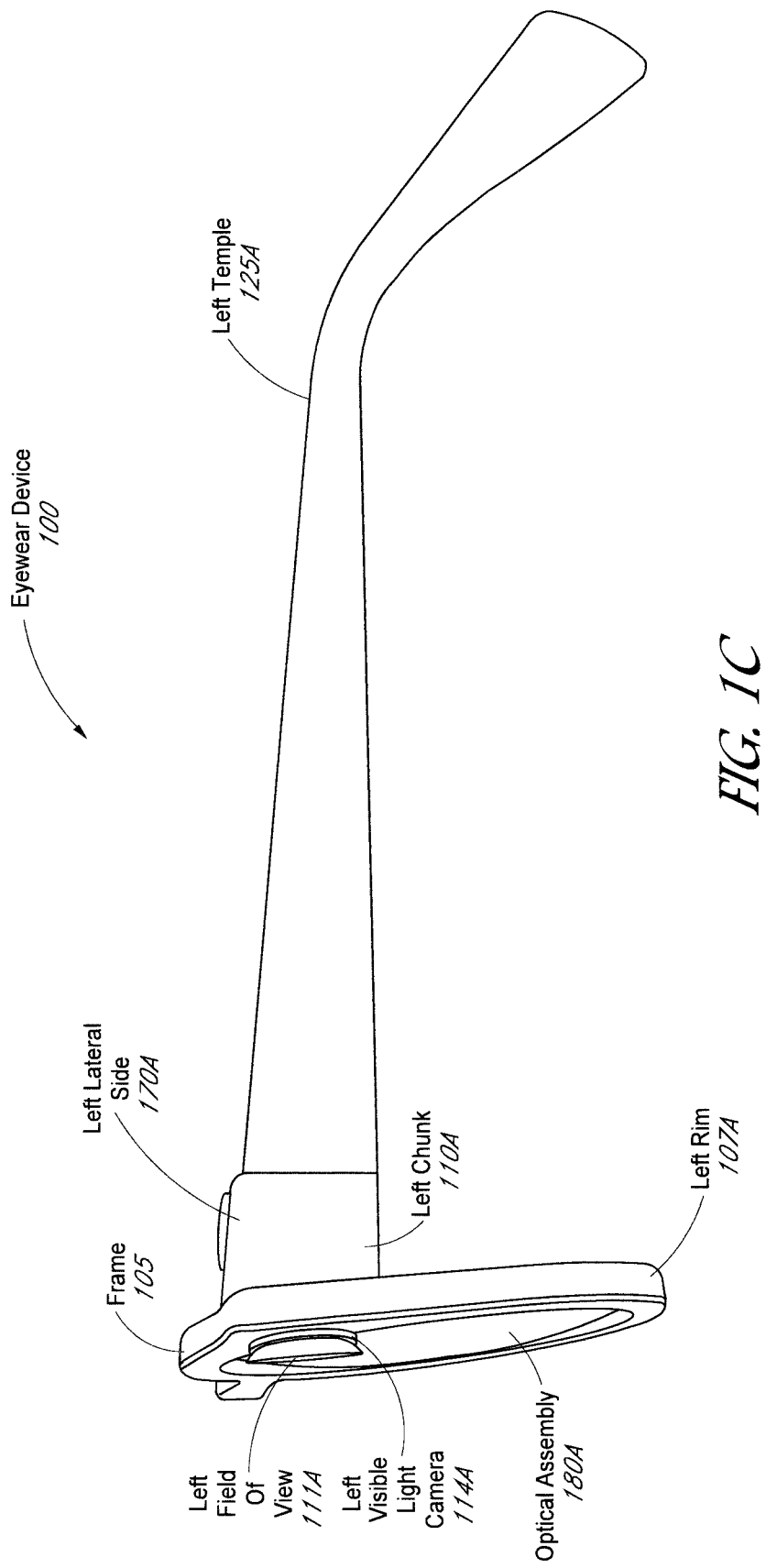
FIG. 1C is a left side view of an example hardware configuration of the eyewear device of FIG. 1A, which shows a left visible light camera.
Figure 1D:
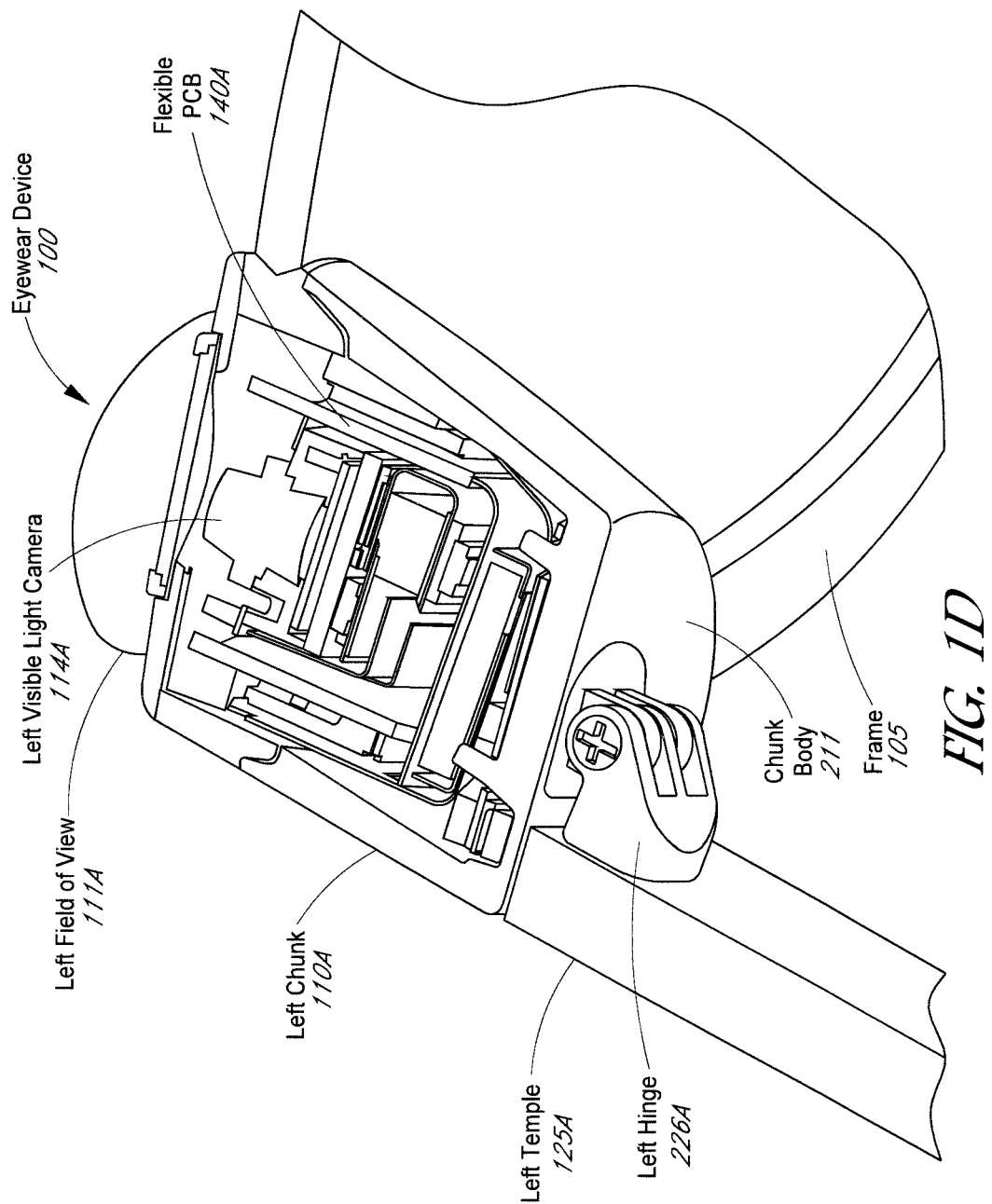
FIG. 1D is a top cross-sectional view of a left chunk of the eyewear device of FIG. 1C depicting the left visible light camera, and a circuit board.

Eyewear device 100, includes a right optical assembly 180B with an image display to present images, such as depth images. As shown in FIGS. 1A-B, the eyewear device 100 includes the right visible light camera 114B. Eyewear device 100 can include multiple visible light cameras 114A-B that form a passive type of three-dimensional camera, such as stereo camera, of which the right visible light camera 114B is located on a right chunk 110B. As shown in FIGS. 1C-D, the eyewear device 100 also includes a left visible light camera 114A.

Left and right visible light cameras 114A-B are sensitive to the visible light range wavelength. Each of the visible light cameras 114A-B have a different frontward facing field of view which are overlapping to enable generation of three-dimensional scenes, for example, right visible light camera 114B depicts a right field of view 111B. Generally, a "field of view" is the part of the scene that is visible through the camera at a particular position and orientation in space. Objects or object features outside the field of view 111A-B when the visible light camera captures the image are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera 220 (see FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 m 3 egapixels), 720p, or 1080p. As used herein, the term "overlapping" when referring to field of view means the matrix of pixels in the generated raw image(s) overlap by 30% or more. As used herein, the term "substantially overlapping" when referring to field of view means the matrix of pixels in the generated raw image(s) or infrared image of a scene overlap by 50% or more.

The eyewear device 100 may capture image sensor data from the visible light cameras 114A-B along with geolocation data, digitized by an image processor, for storage in a memory. The left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute value (e.g., a red pixel light value, a green pixel light value, and/or a blue pixel light value); and a position attribute (e.g., an X location coordinate and a Y location coordinate).

To provide stereoscopic vision, an image processor (element 912 of FIG. 3) may couple to visible light cameras 114A-B to receive image information for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B enable simulation of human binocular vision. The cameras provide the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor), depth images are generated, and the generated depth images, which a user perceives on an optical assembly 180A-B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex includes a color attribute value (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A-B. Disparity is the difference in image location of the same 3D point when projected under perspective of the visible light cameras 114A-B ($d = x_{left} - x_{right}$). For visible light cameras 114A-B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used.

In an example, a dirty lens image correction system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes two cameras. The two cameras may include at least two visible light cameras with overlapping fields of view. In one example, the two cameras include a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

The dirty lens image correction system further includes a computing device, such as a host computer (e.g., mobile device 990 of FIGS. 3-4) coupled to eyewear device 100 over a network or a central processing unit (CPU 1030; FIG. 5) of the eyewear device 100. The dirty lens image correction system further includes an image display (optical assembly 180A-B of eyewear device; image display 1080 of mobile device 990 of FIG. 4) for presenting (e.g., displaying) a three-dimensional image. Dirty lens image correction system further includes an image display driver (element 942 of eyewear device 100 of FIG. 3; element 1090 of mobile device 990 of FIG. 4) coupled to the image display (optical assembly 180A-B of eyewear device; image display 1080 of mobile device 990 of FIG. 5) to control the image display.

The dirty lens image correction system further includes a user input device to receive a two-dimensional input selection from a user. Examples of user input devices include a touch sensor (element 991 of FIG. 4 for the eyewear device 100), a touch screen display (element 1091 of FIG. 5 for the mobile device 1090), and a computer mouse for a personal computer or a laptop computer. Dirty lens image correction system further includes a processor (element 932 of eyewear device 100 of FIG. 4; element 1030 of mobile device 990 of FIG. 5) coupled to the eyewear device 100 and the visible light cameras 114A and 114B. The dirty lens image correction system further includes a memory (element 934 of eyewear device 100 of FIG. 3; elements 1040A-B of mobile device 990 of FIG. 4) accessible to the processor, and image correction programming in the memory (element 945 of eyewear device 100 of FIG. 3; element 945 of mobile device 990 of FIG. 4), for example in the eyewear device 100 itself, mobile device (element 990 of FIG. 3), or another part of the dirty lens image correction system (e.g., server system 998 of FIG. 3). Execution of the programming (element 945 of FIG. 3) by the processor (element 932 of FIG. 3) configures the eyewear device 100 to generate, via images obtained by the visible light cameras 114A and 114B, the depth image. The depth image includes a matrix of vertices. Each vertex represents a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for depth.

Execution of the image correction programming (element 945 of FIG. 4) by the processor (element 1030 of FIG. 4) configures the mobile device (element 990 of FIG. 4) of the dirty lens image correction system to perform functions. Various image correction programming (element 945 of FIGS. 4-5) functions described herein may be implemented within other parts of the dirty lens image correction system, such as the eyewear device 100 or another host computer besides mobile device (element 990 of FIG. 5), such as a server system (element 998 of FIG. 4).

FIG. 1B is a top cross-sectional view of a right chunk 110B of the eyewear device 100 of FIG. 1A depicting the right visible light camera 114B of the camera system, and a circuit board. FIG. 1C is a left side view of an example hardware configuration of an eyewear device 100 of FIG. 1A, which shows a left visible light camera 114A of the camera system. FIG. 1D is a top cross-sectional view of a left chunk 110A of the eyewear device of FIG. 1C depicting the left visible light camera 114A, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 226B connects the right chunk 110B to a right temple 125B of the eyewear device 100. In some examples, components of the right visible light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the frame 105. For example, the right rim 107B of the frame 105 is connected to the right chunk 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing field of view 111B with a line of sight or perspective of the right eye of the user of the eyewear device 100. The visible light camera cover lens can also be adhered to an outward facing surface of the right chunk 110B in which an opening is formed with an outward facing angle of coverage, but in a different outwards direction. The coupling can also be indirect via intervening components.

Left (first) visible light camera 114A is connected to a left image display of left optical assembly 180A to capture a left eye viewed scene observed by a wearer of the eyewear device 100 in a left raw image. Right (second) visible light camera 114B is connected to a right image display of right optical assembly 180B to capture a right eye viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

Figure 2A:
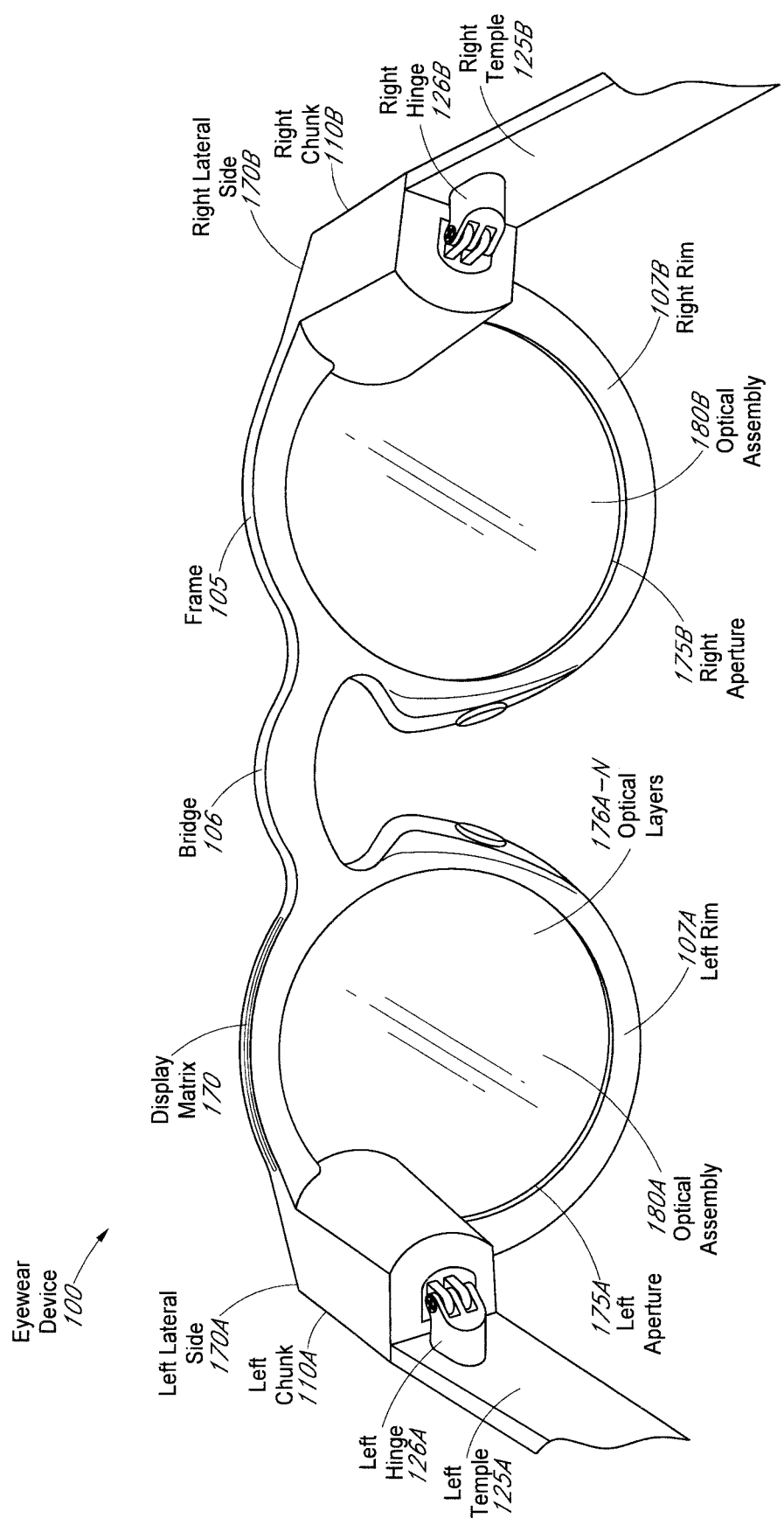
FIGS. 2A and 2B are rear views of example hardware configurations of an eyewear device utilized in the dirty lens image correction system, including two different types of image displays.
Figure 2B:
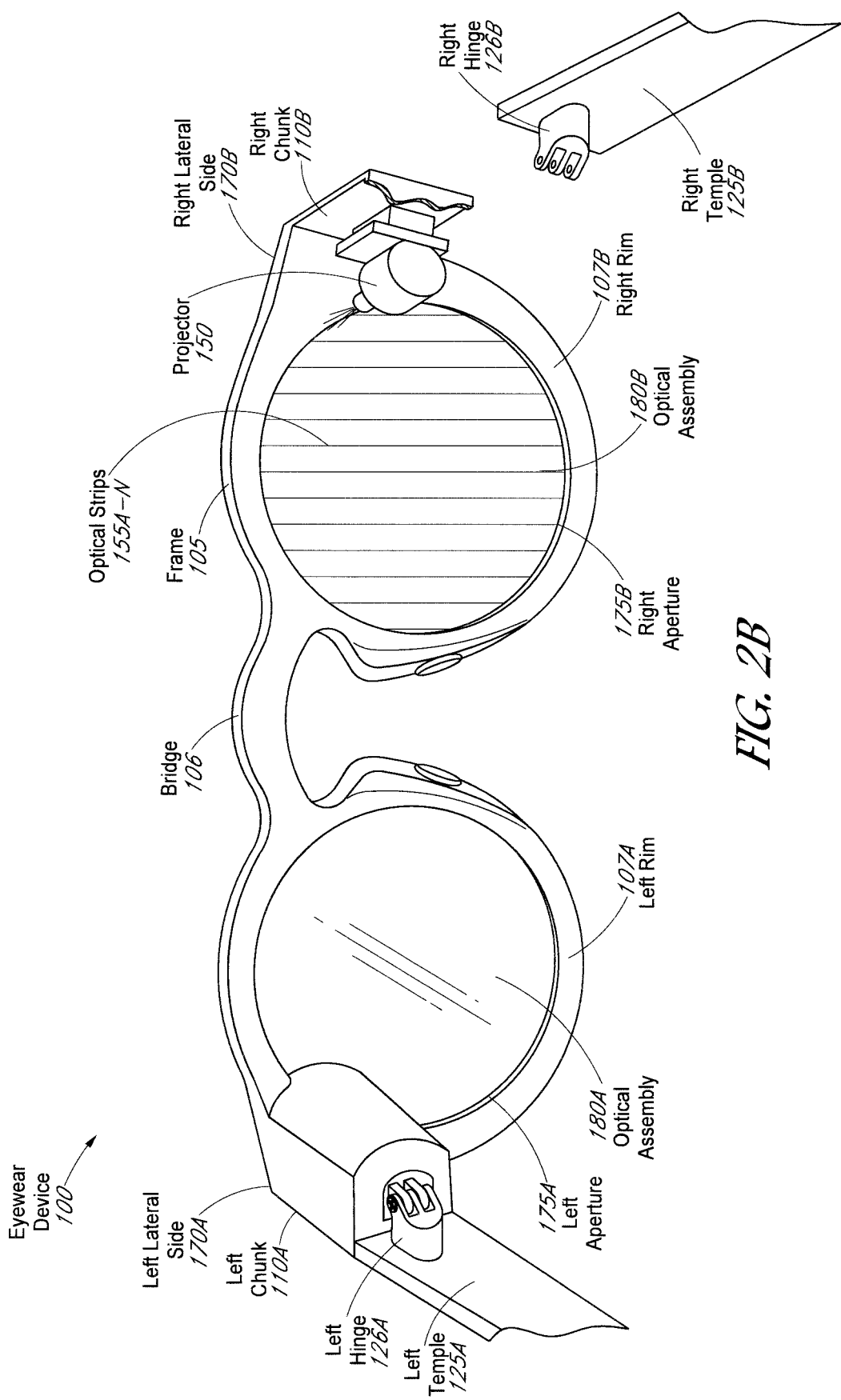

FIGS. 2A-B are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 2A, the optical assembly 180A-B includes a suitable display matrix 170, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2B. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2A-B, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 2A; or optical strips 155A-N' and a projector 150A of FIG. 2B). The second optical assembly 180B includes the second image display e.g., a display matrix 170B of FIG. 2A; or optical strips 155A-N" and a projector 150B of FIG. 2B).

Figure 3:
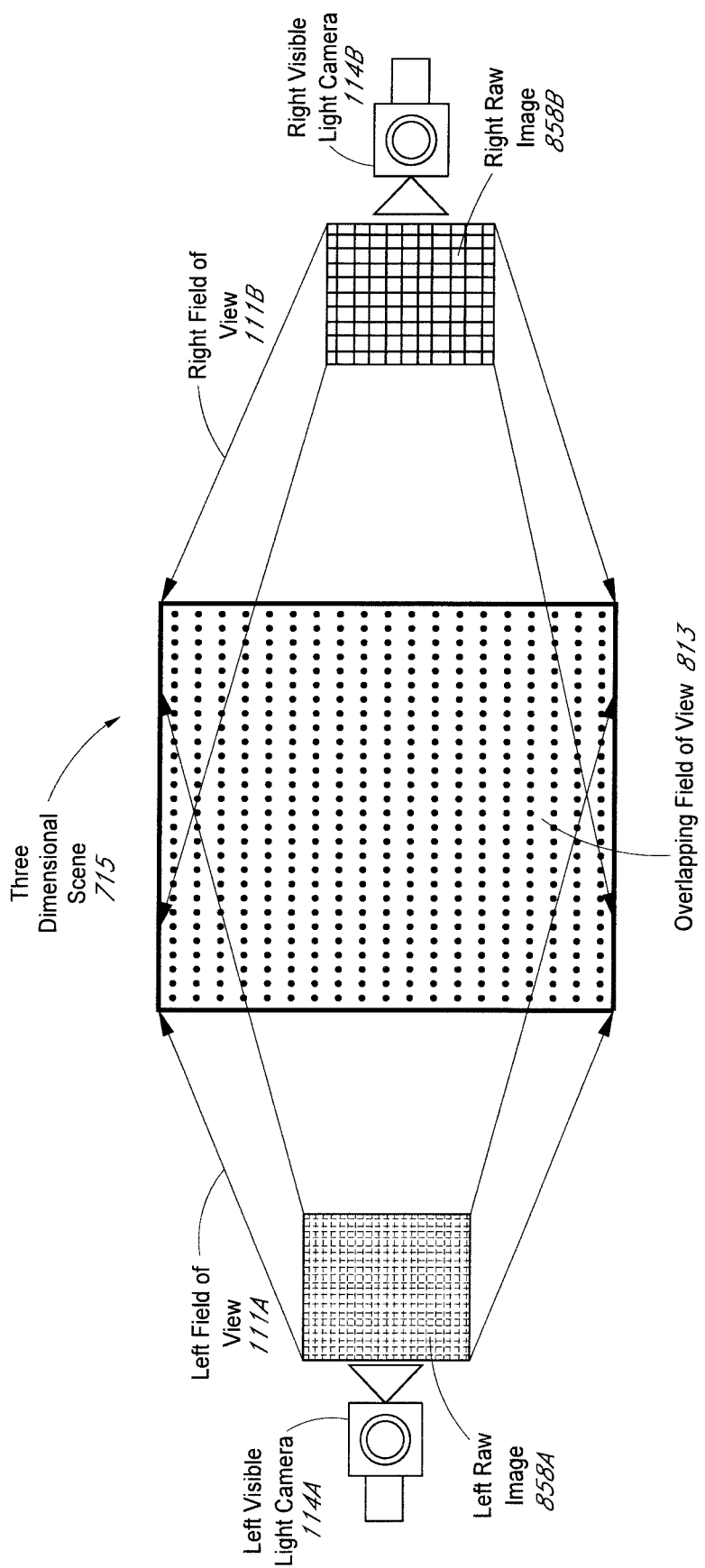
FIG. 3 depicts an example of visible light captured by the left visible light camera as a left raw image and visible light captured by the right visible light camera as a right raw image.

FIG. 3 depicts an example of capturing visible light with the left visible light camera 114A and capturing visible light with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional initial depth image of the three-dimensional scene 715 is generated.

Figure 4:
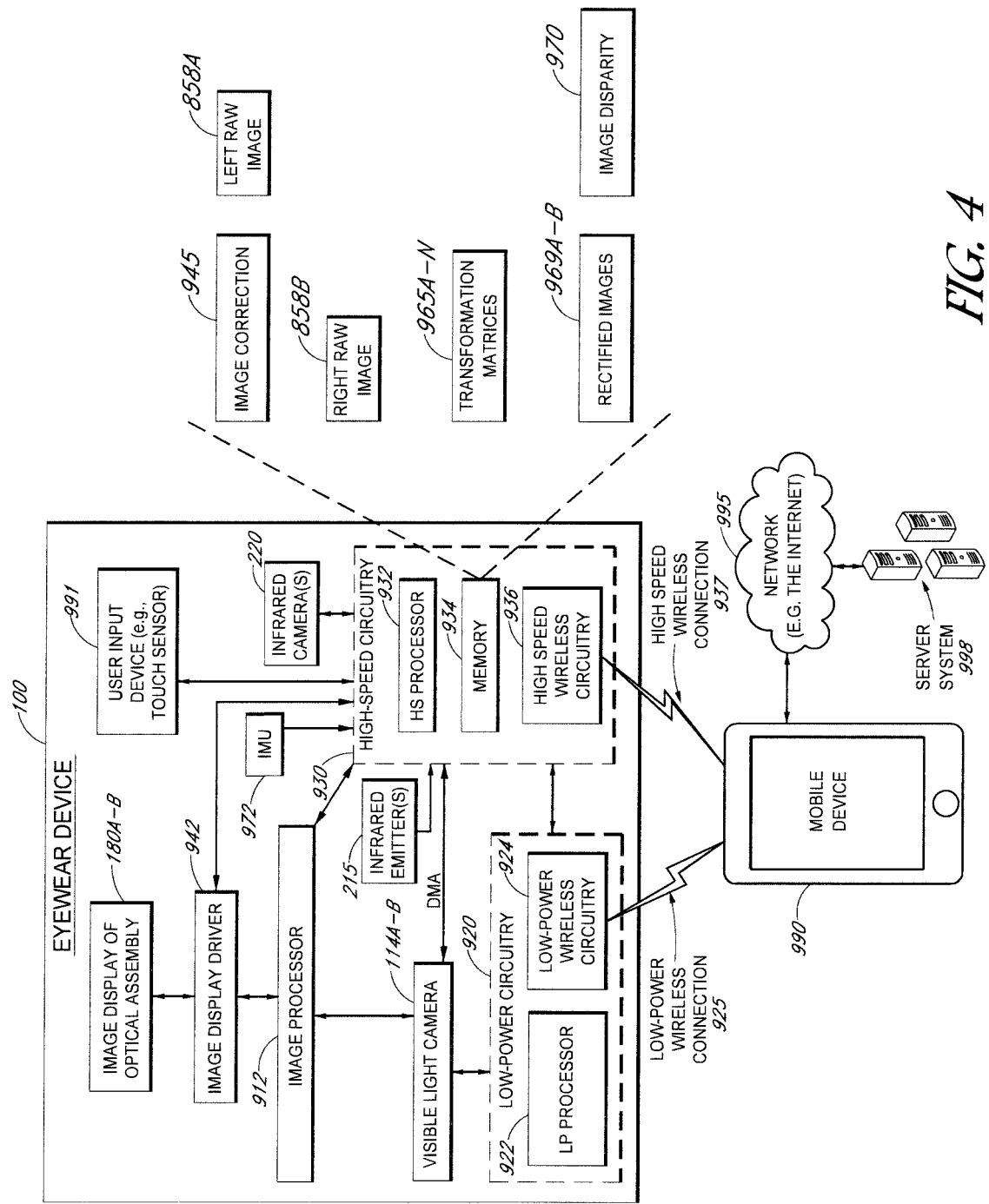
FIG. 4 is a functional block diagram of an example dirty lens image correction system including the eyewear device, a mobile device, and a server system connected via various networks.
Figure 5:
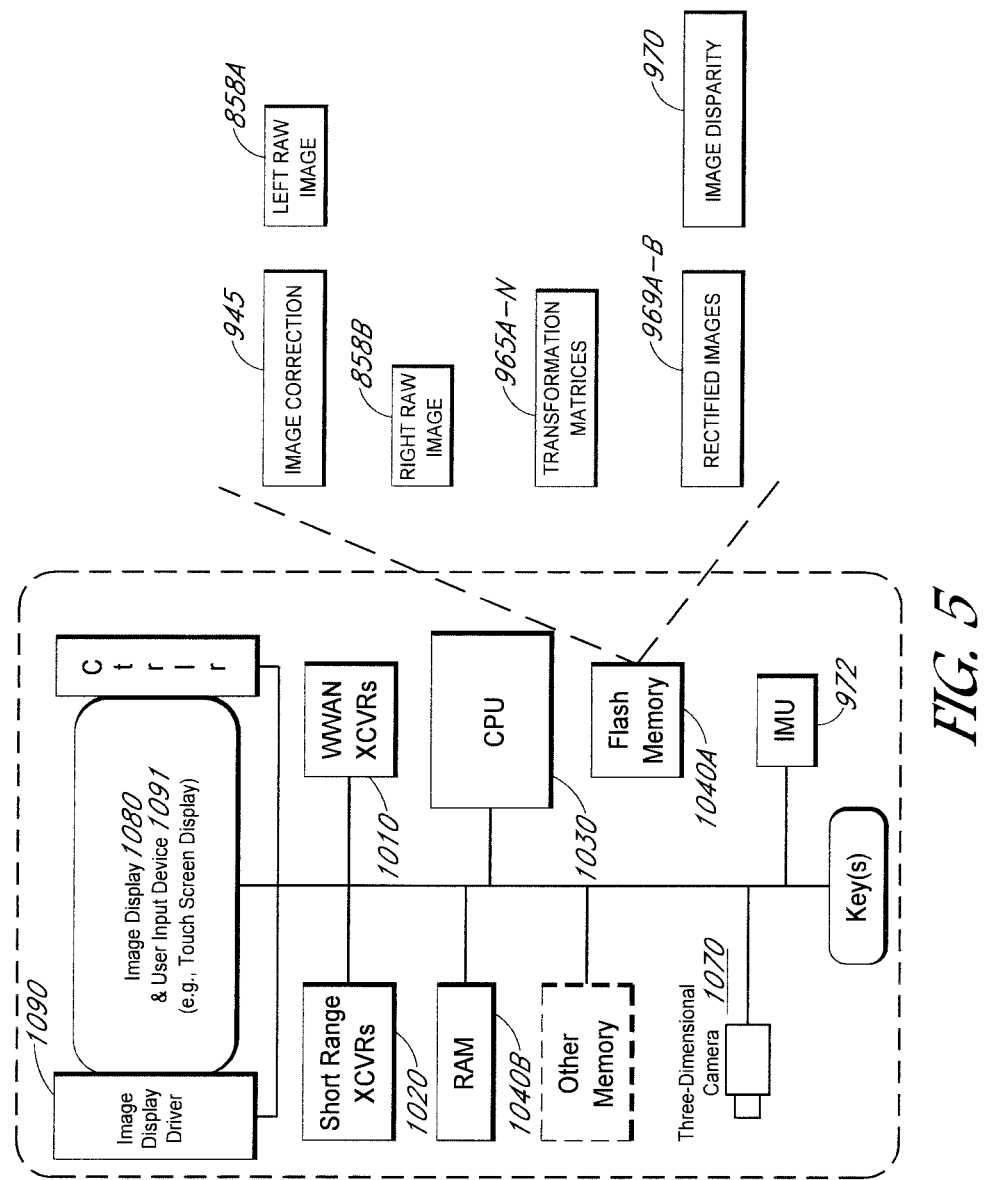
FIG. 5 shows an example of a hardware configuration for the mobile device of the dirty lens image correction system of FIG. 4.

FIG. 4 is a high-level functional block diagram of an example dirty lens image correction system 900, which includes a wearable device (e.g., the eyewear device 100), a mobile device 990, and a server system 998 connected via various networks. Eyewear device 100 includes at least two visible light cameras 114A and 114B (one associated with the left lateral side 170A and one associated with the right lateral side 170B). The eyewear device may additionally include a depth sensor, shown as infrared emitter 215 and infrared camera 220.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180-B are for presenting images and scenes. Image display driver 942 is coupled to the image display of optical assembly 180A-B to control the image display of optical assembly 180A-B to present the images Eyewear device 100 further includes a user input device 991 (e.g., touch sensor) to receive a two-dimensional input selection from a user.

The components shown in FIG. 4 for the eyewear device 100 are located on one or more circuit boards, for example a PCB or flexible PCB, in the rims or temples. Alternatively or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device 100 includes a memory 934 which includes image correction programming 945 to perform a subset or all of the functions described herein for correcting and displaying images. Flowcharts outlining functions which can be implemented in the image correction programming 945 are shown in FIGS. 6-9. As shown, memory 934 further includes a left raw image 858A captured by the left visible light camera 114A, a right raw image 858B captured by the right visible light camera 114B, a left rectified image 1008A corresponding to the left raw image, a right rectified image 1008B corresponding to the right raw image, a left domain adjusted image 1012A corresponding to the left rectified image, and a right domain adjusted image 1012B corresponding to the right rectified image.

As shown in FIG. 4, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes essentially any storage device capable of storing various data and applications, including, among other things, camera data generated by the left and right visible light cameras 114A-B, infrared camera 220, and the image processor 912, as well as images generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

As shown in FIG. 4, the processor 932 of the eyewear device 100 can be coupled to the camera system (visible light cameras 114A-B), the image display driver 942, the user input device 991, and the memory 934. As shown in FIG. 5, the processor 1030 of the mobile device 990 can be coupled to the camera system 1070, the image display driver 1090, the user input device 1091, and the memory 1040A. Eyewear device 100 can perform all or a subset of any of the following functions described below as a result of the execution of the dirty lens correction programming 945 in the memory 934 by the processor 932 of the eyewear device 100. Mobile device 990 can perform all or a subset of any of the following functions described below as a result of the execution of the image correction programming 945 in the memory 1040A by the processor 1030 of the mobile device 990. Functions can be divided in the dirty lens image correction system 900, such that the eyewear device 100 captures the images, but the mobile device 990 performs the remainder of the image processing.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 2A-B (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 5 is a high-level functional block diagram of an example of a mobile device 990 that communicates via the dirty lens image correction system 900 of FIG. 4. Mobile device 990 includes a user input device 1091 to receive a two-dimensional input selection. Mobile device 990 also includes a flash memory 1040A which includes image correction programming 945 to perform all or a subset of the functions described herein. As shown, memory 1040A further includes a left raw image 858A captured by the left visible light camera 114A, a right raw image 858B captured by the right visible light camera 114B, a left rectified image 1008A corresponding to the left raw image, a right rectified image 1008B corresponding to the right raw image, a left domain adjusted image 1012A corresponding to the left rectified image, and a right domain adjusted image 1012B corresponding to the right rectified image. Mobile device 1090 can include a camera system 1070 that comprises at least two visible light cameras (first and second visible light cameras with overlapping fields of view) for capturing the left raw image 858A and the right raw image 858B. When the mobile device 990 includes components like the eyewear device 100, such as the camera system, the left raw image 858A and the right raw image 858B can be captured via the camera system 1070 of the mobile device 990.

As shown, the mobile device 990 includes an image display 1080, an image display driver 1090 to control the image display, and a user input device 1091 similar to the eyewear device 100. In the example of FIG. 5, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

As shown in FIG. 5, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interface) conforms to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for image correction.

Several of these types of communications through the transceivers 1010, 1020 and a network, as discussed previously, relate to protocols and procedures in support of communications with the eyewear device 100 or the server system 998 for image correction, such as transmitting left raw image 858A and right raw image 858B. Such communications, for example, may transport packet data via the short range XCVRs 1020 over the wireless connections 925 and 937 to and from the eyewear device 100 as shown in FIG. 4. Such communications, for example, may also transport data utilizing IP packet data transport via the WWAN XCVRs 1010 over the network (e.g., Internet) 995 shown in FIG. 4. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the image correction programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g., as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including image correction programming 945, are executed. Applications, such as the image correction programming 945, may be a native application, a hybrid application, or a web application (e.g., a dynamic web page executed by a web browser) that runs on mobile device 990 to correct images. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the dirty lens image correction system 900 and that other arrangements may be utilized.

Figure 6:
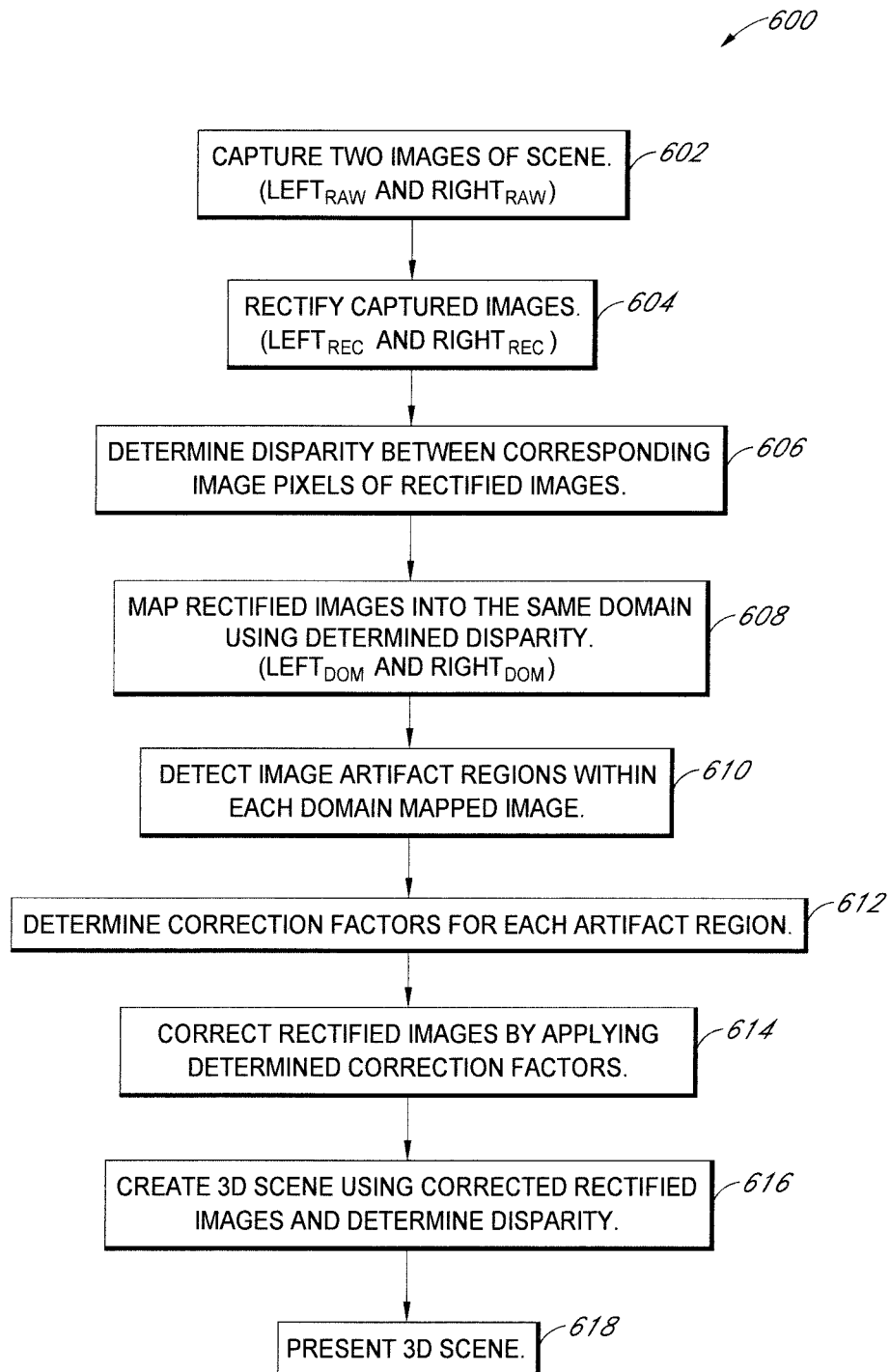
FIG. 6 is a flowchart of an example method for dirty lens image correction and creation and presentation of three dimensional scenes with corrected images.

FIG. 6 is a flowchart of a method with steps that can be implemented in a dirty lens image correction system. To facilitate description and understanding the steps of the following flowcharts are described with reference to the systems and apparatus described herein. One of skill in the art will recognize other suitable systems and apparatus for performing the steps described herein. In addition, the method is described with reference to a camera system that includes two cameras separated in a horizontal direction. In other examples, the cameras may have another orientation with respect to one another (e.g., separated in a vertical direction).

At step 602, obtain two images of a scene. A processor (e.g., element 932 of eyewear device 100 of FIG. 4 or element 1030 of mobile device 990 of FIG. 5) obtains images of the scene captured by respective cameras have different points of view. In an example, a left visible light camera 114a of an eyewear device 100 captures a left raw image (Left$_{RAW}$) and a right visible light image 114b of an eyewear device 100 captures a right raw image (Right$_{RAW}$). The left visible light camera 114a is separated from the right visible light camera in a camera baseline direction (here in a horizontal direction).

Figure 10A:
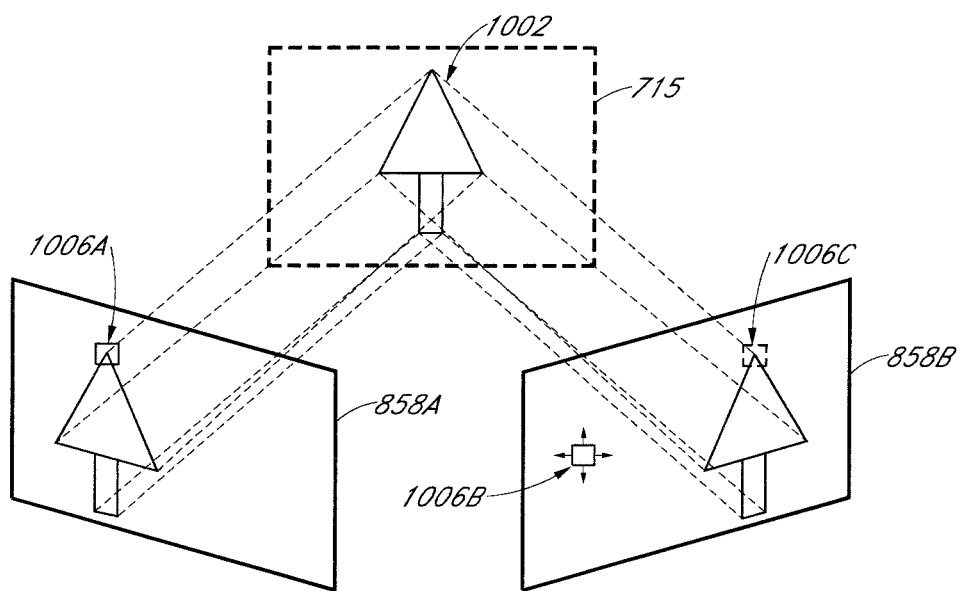
FIGS. 10A, 10B, and 10C are representative illustrations of raw image pairs of a scene (FIG. 10A), rectified image pairs (FIG. 10B), and domain adjusted image pairs (FIG. 10C produced during the method of FIG. 6.

If one of the raw images includes an artifact due to a dirty lens of one camera (assuming the lens of the other camera is not dirty in the same regions), the below steps can correct for the artifact by reducing or eliminating is effect to produce a more pleasing viewable image or scene. FIG. 10A depicts an illustrative example of a left raw image 858A and a right raw image 858B of a three dimensional scene 714 including an object 1002 (i.e., a tree).

At step 604, rectify the obtained images. The processor may rectify the images by applying an algorithm such as shown in Equation (1):

$$(x_{rectilinear}, y_{rectilinear}) = (r_x * x_{RAW}, r_y * y_{RAW}) \quad (1)$$

where $r_x = f(x^2_{RAW})$; and $r_y = f(y^2_{RAW})$;

wherein x is a pixel location in a horizontal direction and y is a pixel location in a vertical direction.

or Equation (2):

$$(x_{rectilinear}, y_{rectilinear}) = (r * x_{RAW}, r * y_{RAW}) \quad (2)$$

where $r = f(x^2_{RAW} + y^2_{RAW})$.

In an example, a monotonic function f is applied, where f is a 1D transformation function (e.g., $f(x) = 1 + k\_1 * x^2 + k\_2 * x^4$; where x is the horizontal pixel distance from the distortion center and k_1 and k_2 are parameters). The monotonic function prevents the mapped image from collapsing on itself (e.g., due to 2 pixels being mapped to the same target).

Figure 10B:
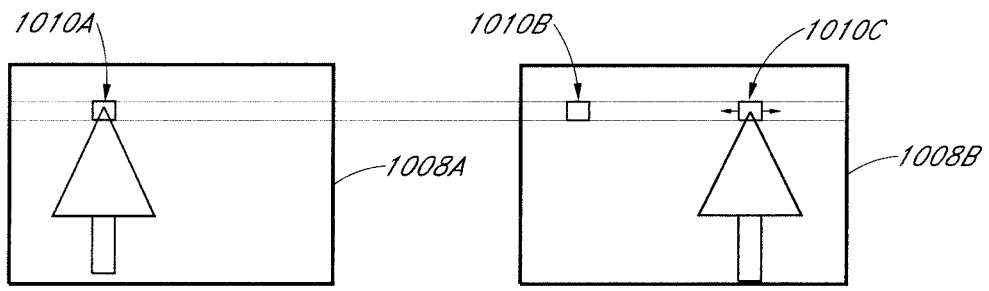

FIG. 10B depicts an illustrative example of a left rectified image 1008A corresponding to the left raw image 858A (FIG. 10A) and a right rectified image 1008B corresponding to the right raw image 858B (FIG. 10A). Due to the cameras' different points of view and lens shape (e.g., fish eye), corresponding pixels for an object 1002 will be located at different positions in the respective left/right/raw rectified images. For example, due to the different points of view, a pixel 1006A within an object (e.g., tip of a tree) appearing on the left half of the left raw image 858A will correspond to a pixel 1006C appearing on the right half of the right raw image 858B rather than to a pixel 1006B in the left half of the right raw image 858B. Additionally, due to lens shape, the pixels 1006A-C may not be on the same horizontal line, which makes it difficult to determine corresponding pixels for the object 1002. During rectification, the raw images 858A/B are transformed into respective rectified images 1008A/B to align the pixels 1010A-C of the object, which facilitates determining corresponding pixels for the object.

Figure 11:
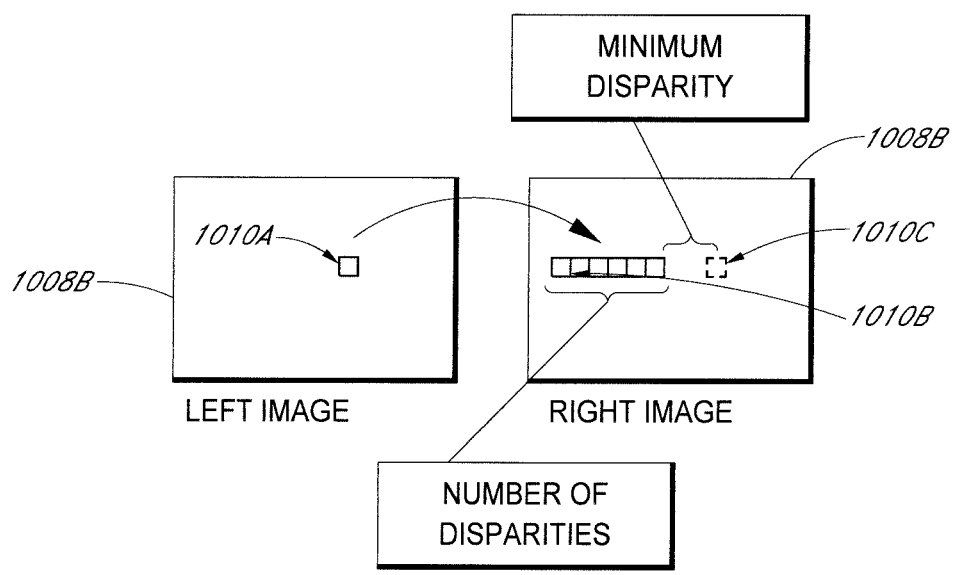
FIG. 11 is a representative illustration of determining pixel disparity between two images of a scene during the method of FIG. 6.

At step 606, determine disparity between corresponding image pixels of rectified images. The processor may determine disparity between the rectified images by correlating the rectified images 1008A/B and determining a number of pixels (typically in the horizontal direction) between a location of a pixel 1010B in the right rectified image 1008B corresponding to where the object pixel 101A appears in the left image 1008A and where the corresponding object pixel 101C actually appears in the right image 1008B. Correlation of the left and right pixels can be achieved with Semi-Global Block Matching (SGBM), for example. FIG. 11 depicts a pixel 1010A in solid line in a left rectified image 1008A and a representation of that same pixel location 1010C is shown in dashed line in the right rectified image 1008B. The disparity for the image pixels in the rectified images is the difference between the represented pixel location 1010C in the right image 1008B and the actual pixel location 1010B of the corresponding feature in the right image 1008B. As illustrated, there may be a minimum expected disparity due to the distance between the cameras capturing the images.

Figure 10C:
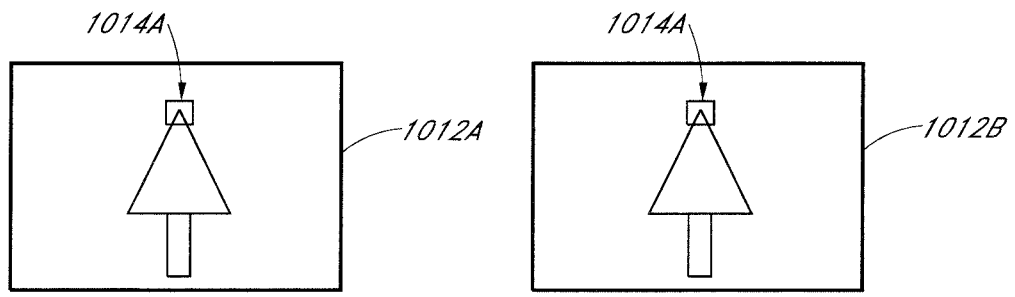

At step 608, map rectified images into the same domain using the determined disparity. The processor may map each of the left and right rectified images into the same domain to create a left domain image (Left$_{DOM}$) and a right domain image (Right$_{DOM}$) where distinctive features found in both rectified images are located at the same coordinates in each image. FIG. 10C depicts an illustrative example of a left domain image (Left$_{DOM}$) 1012A corresponding to the left rectified image 1008A (FIG. 10B) and a right domain image (Right$_{DOM}$) 1012B corresponding to the right domain image 1008B (FIG. 10B). As illustrated in FIG. 10C, the coordinates of the object pixel 1014A in the left domain image 1012A matches the coordinates of the object pixel 1014B in the right domain image 1012A.

Figure 7:
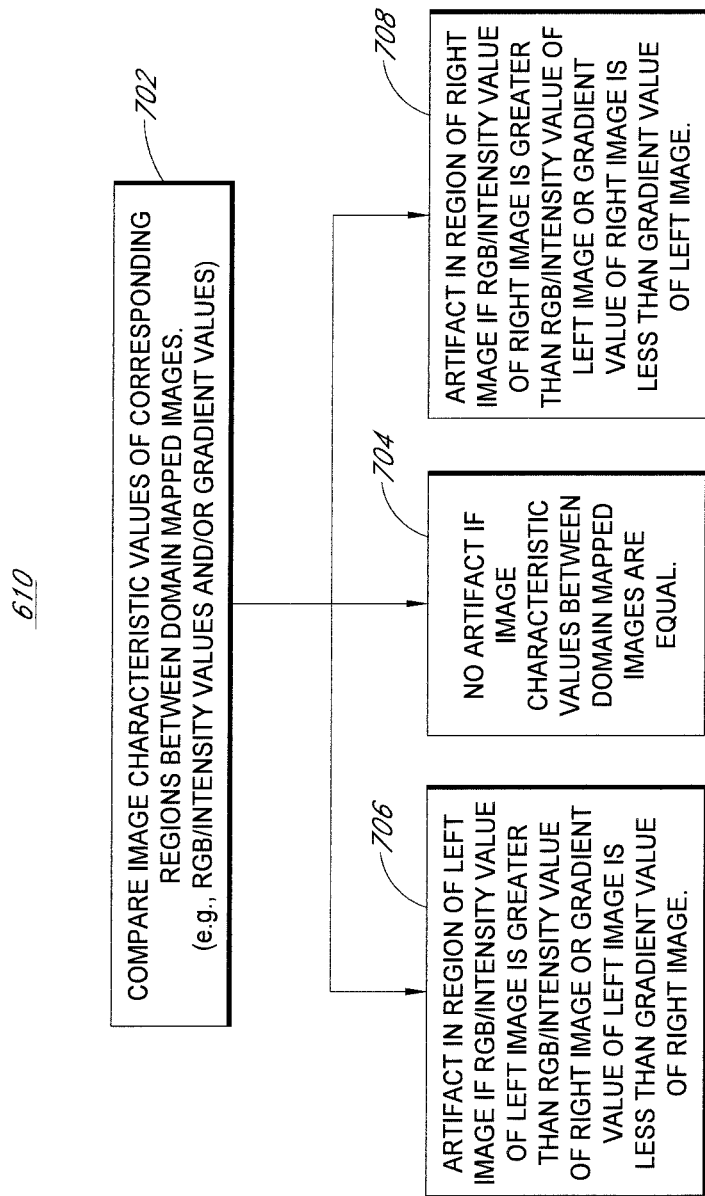
FIG. 7 is a flow chart of example steps for detecting image artifacts in the example method of FIG. 6.

At step 610, detect image artifact regions within each domain mapped image. The processor may detect image artifact regions within the left domain image (Left$_{DOM}$) and the right domain image (Right$_{DOM}$) by comparing image characteristic values of corresponding regions between domain mapped images (step 702; FIG. 7). The regions may be individual pixels or groups of pixels (e.g., 50 pixel blocks). The characteristic values may be color attribute values (e.g., RGB values), gradient values (e.g., gradient vector lengths), or intensity values. If the color attribute values, intensity values, and/or gradient values between the two images are equal, no artifact is present in either images in the region (step 704; FIG. 7). If the color attribute value or intensity value of the left image is greater than the color attribute value or intensity value of the right image OR the gradient value of the left image is less than the gradient value of right image for a region, an artifact is determined to be present in that region of the left image (step 706; FIG. 7). If the color attribute value or intensity value of the right image is greater than the color attribute value or intensity value of the left image OR the gradient value of the right image is less than the gradient value of left image for a region, an artifact is determined to be present in that region of the right image (step 708; FIG. 7). The intensity value (e.g., "gray level") corresponds to the amount of light across the spectrum reaching the sensor (usually computed by adding the RGB channels with weights), e.g., a vector length of the color vectors (after weighting them) to facilitate comparison.

Figure 8:
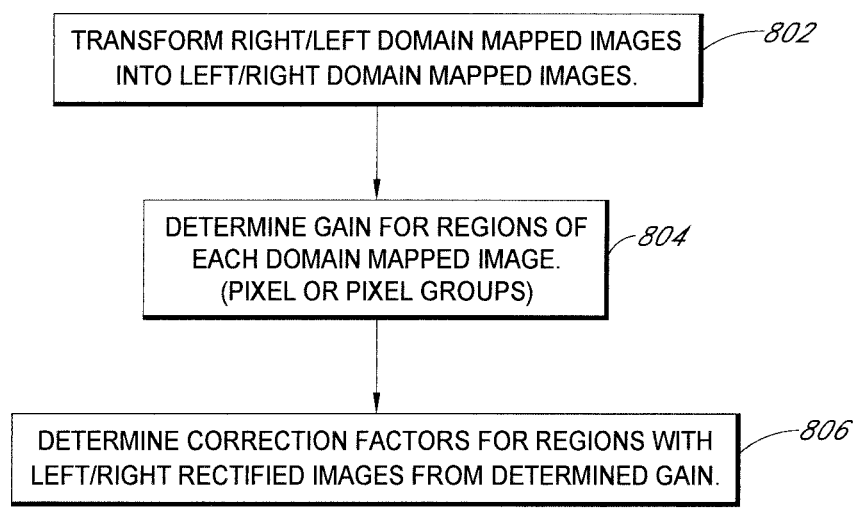
FIG. 8 is a flow chart of example steps for determining correction factors for detected artifacts in the example method of FIG. 6.

At step 612, determine correction factors for the regions determined to have artifacts. The processor may determine correction factors by transforming the domain mapped images into each other and determining a correction factor for each region based on the average gains for pixels in the respective regions. The processor may transform the right domain mapped image into the left domain mapped region and may transform the left domain mapped image in the right domain mapped region (step 802; FIG. 8). The processor may then determine the gain for regions determined to have artifacts (step 804; FIG. 8).

The processor may determine correction factors for corresponding regions within the left and the right rectified images from the determined gain (step 806). The processor may determine a color attribute factor for each region that can be used to adjust that region. For example, if a region is determined to have a color attribute value gain of 0.80, a color attribute correction factor of 1.25 (1.0/0.80) may be determined for the region. Additionally, the processor may determine correspondence between the regions of the domain mapped images (i.e., left domain mapped image and right domain mapped image) and regions of the respective rectified images (i.e., left rectified image and right rectified image) for application of the correction factors to the determined regions to the rectified images. The processor may determine correspondence by mapping the left artifact region of the left domain mapped image to a corresponding left region of the left rectified image, mapping the right artifact region of the right domain mapped image to a corresponding right region of the right rectified image, applying the left correction factor to the corresponding left region of the left rectified image, and applying the right correction factor to the corresponding right region of the right rectified image.

As step 614, correct the rectified images by applying the determined correction factors. The processor may correct the rectified images by apply (e.g., multiplying) the determined correction factors to the color attribute value in the respective regions of the appropriate rectified image.

Figure 9:
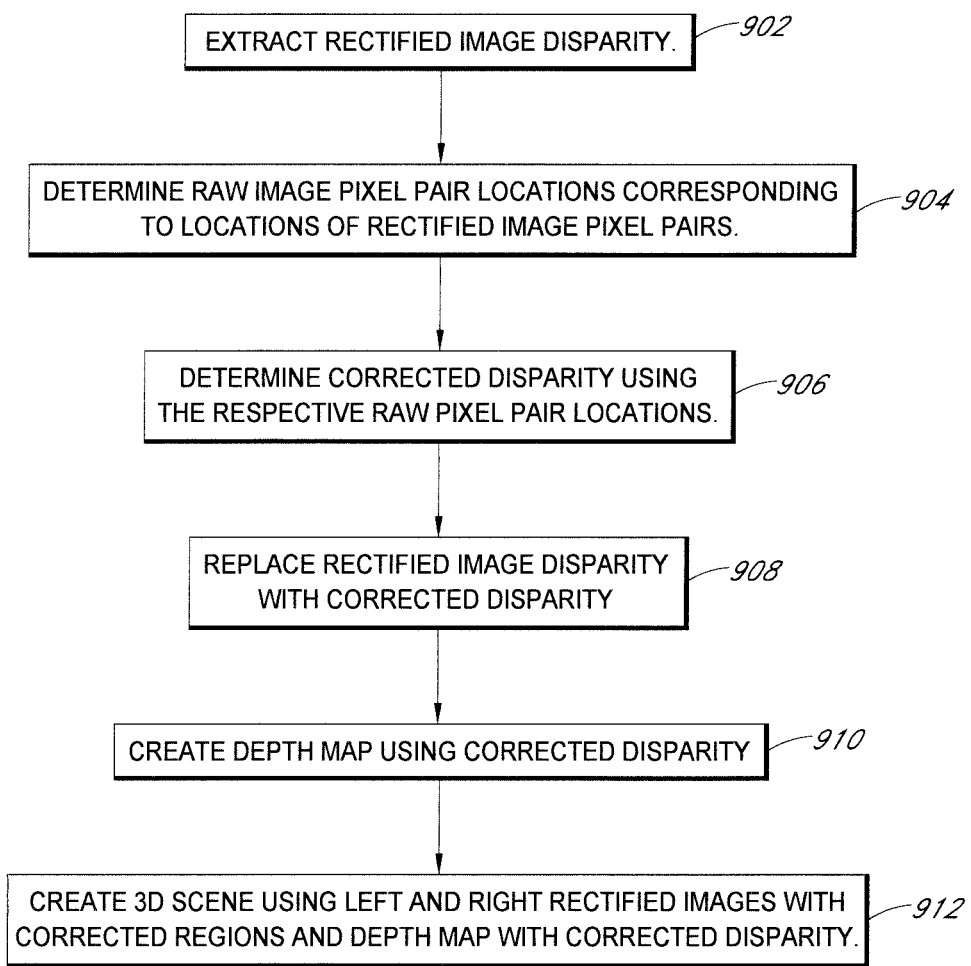
FIG. 9 is a flow chart of example steps for creating a 3D scene in the example method of FIG. 6.

At step 616, create a 3D scene using the corrected rectified images and the determined disparity. The processor may extract the image disparity by retrieving the image disparity determined in step 606 from memory (step 902; FIG. 9). The processor then determines the raw image pixel pair locations corresponding to locations of rectified image pixel pairs (step 904; FIG. 9) and corrects the disparity using the raw image pixel pair locations (step 906; FIG. 9) in order to more accurately determine the actual depth of objects within a scene. The processor then creates a depth map using the corrected disparity (step 910; FIG. 9). The processor then creates a 3D scene using the left and right rectified image having replaced corrected regions and the depth map with the corrected disparity (step 912; FIG. 9).

At step 618, present the 3D scene. The processor may present the 3D scene on a display of the eyewear or a mobile device coupled to the eyewear.

Any of the image correction functionality described herein for the eyewear device 100, mobile device 990, and server system 998 can be embodied in one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A dirty lens correction system comprising:
    an electronic device including:
        a frame; and
        a first camera including a first lens and a second camera including a second lens supported by the frame, wherein the first camera has a first viewpoint and the second camera has a second viewpoint separated from the first viewpoint in a camera baseline direction;
    an image display;
    an image display driver coupled to the image display to control the image display;
    a memory;
    a processor coupled to the first camera, the second camera, the image display driver, and the memory; and
    programming in the memory, wherein execution of the programming by the processor configures the system to perform functions, including functions to:
        obtain a first raw pixel image of a scene captured with the first camera;
        obtain a second raw image of the scene captured with the second camera;
        rectify the first and second raw pixel images to create respective first and second rectified pixel images;
        determine disparity correspondence between corresponding image pixel pairs of the first and second rectified images in the camera baseline direction by performing function to extract rectified image disparity by correlating pixels in the first rectified image with the second rectified image for each of the correlated pixels, determine respective raw image pixel pair locations in the first and second raw pixel images corresponding to locations of the corresponding image pixel pairs in the first and second rectified image, determine corrected disparity using the respective raw pixel air locations, and replace the rectified image disparity with the corrected disparity;
        map the first and second rectified images into the same domain using the determined disparity;

detect image artifact regions within each domain mapped image by comparing corresponding regions of the domain mapped images;

determine correction factors for each detected image artifact region; and correct the rectified first and second images by applying the determined correction factors.

2. The system of claim 1, wherein:

the first camera is a first visible light camera configured to capture the first raw pixel image; and the second camera is a second visible light camera configured to capture the second raw pixel image.

3. A dirty lens correction system comprising:

an electronic device including:

a frame; and a first camera including a first lens and a second camera including a second lens supported by the frame, wherein the first camera has a first viewpoint and the second camera has a second viewpoint separated from the first viewpoint in a camera baseline direction;

an image display;

an image display driver coupled to the image display to control the image display;

a memory;

a processor coupled to the first camera, the second camera, the image display driver, and the memory; and programming in the memory, wherein execution of the programming b the processor configures the system to perform functions, including functions to:

obtain a first raw pixel image of a scene captured with the first camera;

obtain a second raw image of the scene captured with the second camera;

rectify the first and second raw pixel images to create respective first and second rectified pixel images;

determine disparity correspondence between corresponding image pixel pairs of the first and second rectified images in the camera baseline direction;

map the first and second rectified images into the same domain using the determined disparity;

detect image artifact regions within each domain mapped image by comparing corresponding regions of the domain mapped images;

determine correction factors for each detected image artifact region; and correct the rectified first and second images by applying the determined correction factors;

wherein the function to rectify the first and second raw pixel images applies:

$$(x_{rectilinear}, y_{rectilinear}) = (r_x * x_{RAW}, r_y * y_{RAW})$$

where $r_x = f(x^2_{RAW})$; and $r_y = f(y^2_{RAW})$;

wherein x is a pixel location in a horizontal direction and y is a pixel location in a vertical direction.

4. The system of claim 1, wherein the function to map the first and second rectified images into the same domain creates respective first and second domain mapped images and wherein the function to detect the image artifact regions includes a function to:

compare image characteristic values of the corresponding regions between the first and second domain mapped regions, the image characteristic values including at least one of color attribute values, gradient values, or intensity value.

5. The system of claim 4, wherein the function to detect the image artifact region further includes a function to:

detect a first artifact region of the first domain mapped image if, for that region, at least one of the color attribute value of the first domain mapped image is greater than the color attribute value of the second domain mapped image, the gradient value of the first domain mapped image is less than the gradient value of second domain mapped image, or the intensity value of the first domain mapped image is greater than the intensity value of the second domain mapped image; and detect a second artifact region of the second domain mapped image if, for that region, at least one of the color attribute value of the second domain mapped image is greater than the color attribute value of the first domain mapped image, the gradient value of the second domain mapped image is less than the gradient value of first domain mapped image, or the intensity value of the second domain mapped image is greater than the intensity value of the first domain mapped image.

6. The system of claim 4, wherein the function to determine correction factors includes functions to:

transform the second domain mapped image into the first domain mapped image to obtain a first transformed region;

determine a first image characteristic gain for the first artifact region;

determine a first region correction factor for the first artifact region;

transform the first domain mapped image into the second domain mapped image to obtain a second transformed region;

determine a second image characteristic gain for the second artifact region; and determine a second region correction factor for the second artifact region.

7. The system of claim 6, wherein the function to correct the rectified first and second images includes functions to:

map the first artifact region of the first domain mapped image to a corresponding first region of the first rectified image;

map the second artifact region of the second domain mapped image to a corresponding second region of the second rectified image;

apply the first correction factor to the corresponding first region of the first rectified image; and apply the second correction factor to the corresponding second region of the second rectified image.

8. The system of claim 3, wherein the function to determine disparity correspondence between corresponding image pixel pairs of the first and second rectified images includes functions to:

extract rectified image disparity by correlating pixels in the first rectified image with the second rectified image for each of the correlated pixels;

determine respective raw image pixel pair locations in the first and second raw pixel images corresponding to locations of the corresponding image pixel pairs in the first and second rectified images;

determine corrected disparity using the respective raw pixel pair locations; and replace the rectified image disparity with the corrected disparity.

9. The system of claim 1, wherein the functions further include a function to:

create a depth map using the corrected disparity, wherein the depth map includes a plurality of vertices based on the corrected distortion disparity and wherein each vertex includes one or more of a color attribute or a texture attribute.

10. The system of claim 9, wherein the functions further include functions to:
create a three dimensional scene using the first and second rectified images with corrected regions and the depth map with the corrected disparity; and
present the three dimensional image on a display of the eyewear or a remote display of a remote portable device coupled to the eyewear.

11. A dirty lens correction method comprising the steps of:
obtaining a first raw pixel image of a scene captured with a first camera of an electronic device;
obtaining a second raw image of the scene captured with the second camera of the electronic device, the second camera separated from the first camera in a camera baseline direction;
rectifying the first and second raw pixel images to create respective first and second rectified pixel images;
determining disparity correspondence between corresponding image pixel pairs of the first and second rectified images in the camera baseline direction by extracting rectified image disparity by correlating pixels in the first rectified image with the second rectified image for each of the correlated pixels, determining respective raw image pixel pair locations in the first and second raw pixel images corresponding to locations of the corresponding image pixel airs in the first and second rectified images, determining corrected disparity using the respective raw pixel pair locations, and replacing the rectified image disparity with the corrected disparity;
mapping first and second rectified images into the same domain using the determined disparity;
detecting image artifact regions within each domain mapped image by comparing corresponding regions of the domain mapped images;
determining correction factors for each detected image artifact region; and
correcting the rectified first and second images by applying the determined correction factors.

12. The method of claim 11, wherein the first camera is a first visible light camera and the second camera is a second visible light camera, the method further comprising the steps of:
capturing the first raw image with the first visible light camera of the eyewear device; and
capturing the second raw image with the second visible light camera of the eyewear device.

13. A dirty lens correction method comprising the steps of:
obtaining a first raw pixel image of a scene captured with a first camera of an electronic device;
obtaining a second raw image of the scene captured with the second camera of the electronic device, the second camera separated from the first camera in a camera baseline direction;
rectifying the first and second raw pixel images to create respective first and second rectified pixel images;
determining disparity correspondence between corresponding image pixel pairs of the first and second rectified images in the camera baseline direction;
mapping first and second rectified images into the same domain using the determined disparity;
detecting image artifact regions within each domain mapped image by comparing corresponding regions of the domain mapped images;
determining correction factors for each detected image artifact region; and
correcting the rectified first and second images by applying the determined correction factors;
wherein the rectifying step applies:

$$(x_{rectilinear}, y_{rectilinear}) = (r_x * x_{RAW}, r_y * y_{RAW})$$

where $r_x = f(x^2_{RAW})$; and $$r_y = f(y^2_{RAW});$$

wherein x is a pixel location in a horizontal direction and y is a pixel location in a vertical direction.

14. The method of claim 11, wherein the mapping step creates respective first and second domain mapped images and wherein the detecting the image artifact regions step comprises:
comparing image characteristic values of the corresponding regions between the first and second domain mapped regions, the image characteristic values including as least one of color attribute values, gradient values, or intensity values.

15. The method of claim 14, wherein the detecting the image artifact region step further comprises:
detecting a first artifact region of the first domain mapped image if, for that region, at least one of the color attribute value of the first domain mapped image is greater than the color attribute value of the second domain mapped image, the gradient value of the first domain mapped image is less than the gradient value of second domain mapped image, or the intensity value of the first domain mapped image is greater than the intensity value of the second domain mapped image; and
detecting a second artifact region of the second domain mapped image if, for that region, at least one of the color attribute value of the second domain mapped image is greater than the color attribute value of the first domain mapped image, the gradient value of the second domain mapped image is less than the gradient value of first domain mapped image, or the intensity value of the second domain mapped image is greater than the intensity value of the first domain mapped image.

16. The method of claim 14, wherein the determining correction factors step comprises:
transforming the second domain mapped image into the first domain mapped image to obtain a first transformed region;
determining a first image characteristic gain for the first artifact region;
determining a first region correction factor for the first artifact region;
transforming the first domain mapped image into the second domain mapped image to obtain a second transformed region;
determining a second image characteristic gain for the second artifact region; and
determining a second region correction factor for the second artifact region.

17. The method of claim 16, wherein the correcting the rectified first and second images step comprises:
mapping the first artifact region of the first domain mapped image to a corresponding first region of the first rectified image;

mapping the second artifact region of the second domain mapped image to a corresponding second region of the second rectified image;

applying the first correction factor to the corresponding first region of the first rectified image; and applying the second correction factor to the corresponding second region of the second rectified image.

18. The method of claim 13, wherein the determining disparity correspondence between corresponding image pixel pairs of the first and second rectified images step comprises:

extracting rectified image disparity by correlating pixels in the first rectified image with the second rectified image for each of the correlated pixels;

determining respective raw image pixel pair locations in the first and second raw pixel images corresponding to locations of the corresponding image pixel pairs in the first and second rectified images;

determining corrected disparity using the respective raw pixel pair locations; and replacing the rectified image disparity with the corrected disparity.

19. The method of claim 11, further comprising:

creating a depth map using the corrected disparity, wherein the depth map includes a plurality of vertices based on the corrected distortion disparity and wherein each vertex includes one or more of a color attribute or a texture attribute.

20. The method of claim 19, further comprising:

creating a three dimensional scene using the first and second rectified images with corrected regions and the depth map with the corrected disparity; and presenting the three dimensional image on a display of the eyewear or a remote display of a remote portable device coupled to the eyewear.

* * * * *